(12) United States Patent
Shoji et al.

(10) Patent No.: US 8,010,114 B2
(45) Date of Patent: Aug. 30, 2011

(54) MOBILE COMMUNICATIONS SYSTEM AND COMMUNICATION BRANCH ESTABLISHING METHOD

(75) Inventors: Makoto Shoji, Fukuoka (JP); Masafumi Masuda, Yokosuka (JP); Takaaki Sato, Kawasaki (JP); Hironari Kobayashi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1041 days.

(21) Appl. No.: 11/837,926

(22) Filed: Aug. 13, 2007

(65) Prior Publication Data

US 2008/0039143 A1 Feb. 14, 2008

(30) Foreign Application Priority Data

Aug. 14, 2006 (JP) ................................. 2006-221263

(51) Int. Cl.
*H04W 36/00* (2009.01)
(52) U.S. Cl. .......................... 455/439; 455/561; 455/443
(58) Field of Classification Search .......... 455/436–440, 455/442–444, 561, 562.1
See application file for complete search history.

(56) References Cited

U.S. PATENT DOCUMENTS

| 7,050,412 B2 * | 5/2006 | Cave et al. ..................... 370/335 |
| 2006/0128386 A1 | 6/2006 | Ohtani et al. | |

FOREIGN PATENT DOCUMENTS

| EP | 0 896 442 A1 | 2/1999 |
| EP | 1 484 932 A2 | 12/2004 |
| EP | 1 799 002 A1 | 6/2007 |
| JP | 2004-364054 | 12/2004 |
| JP | 2006-108891 | 4/2006 |
| WO | WO 2006/038592 A1 | 4/2006 |

OTHER PUBLICATIONS

"3rd Generation Partnership Project; Technical Specification Group Radio Access Network; IP transport in UTRAN (Release 5)," 3GPP TR 25.933 V5.4.0, Dec. 2003, pp. 1-138.
"3rd Generation Partnership Project; Technical Specification Group Services and System Aspects; Technical Specifications and Technical Reports for a UTRAN-based 3GPP system (Release 6)," 3GPP TS 21.101 V6.4.1 Apr. 2006, pp. 1-28.

* cited by examiner

*Primary Examiner* — Christian A Hannon
(74) *Attorney, Agent, or Firm* — Oblon, Spivak, McClelland, Maier & Neustadt, L.L.P.

(57) ABSTRACT

A disclosed mobile radio communications system comprises an exchange station; first and second radio base stations configured to radio-communicate with a mobile station and configured to relay data from the mobile station; first and second radio control stations configured to wire-communicate with the first and second radio base stations, respectively, and configured to establish a wired communication path for relaying the data transmitted from the mobile station to the exchange station; a transmission device configured to wire-communicate with the first and second radio base stations, and configured to establish a local wired communication branch for relaying the data transmitted from the mobile station between the first and second radio base stations without going through the first or second radio control station; a third radio base station configured to radio-communicate with the mobile station, configured to relay the data transmitted from the mobile station, and incapable of communicating with the transmission device; and a third radio control station configured to wire-communicate with the third radio base station, and configured to establish a wired communication branch for relaying the data transmitted from the mobile station to the exchange station.
A method of adding a radio communication branch comprises the step of, when a request for adding a radio communication branch through the third radio base station is generated while the data transmitted from the mobile station is being relayed via the local wired communication branch, determining whether to reject the request, based on a radio quality parameter between the mobile station and the third radio base station.

2 Claims, 7 Drawing Sheets

MOBILE COMMUNICATIONS SYSTEM AND COMMUNICATION BRANCH ESTABLISHING METHOD

BACKGROUND OF THE INVENTION

1. Field of the Invention

The present invention generally relates to mobile radio communication, especially relates to a method and system for establishing and adding a radio communication branch in a mobile communications system, and further especially relates to such a method and system for establishing and adding a radio communication branch based on a radio quality parameter between a mobile station and a radio base station.

2. Description of the Related Art

Recently, 3GPP (3rd Generation Partnership Project) has proposed the WCDMA (Wideband Code Division Multiple Access) mobile radio communications system based on Code Division Multiple Access (CDMA) technology, which is standardized in the below described Non-patent Document #1.

The WCDMA system has a diversity hand-over function as a function of radio layer 2. With reference to FIG. 1, the diversity hand-over function is explained below. While performing hand-over, a mobile station 11 can radio-communicate over plural radio links (a link is referred to also as a "branch") through plural radio base stations (21 and 22). A radio control station 31 has a radio layer 2 protocol termination function unit called diversity hand-over trunk (DHT: Diversity Handover Trunk). The radio layer 2 protocol termination function unit performs downlink data copying distribution and uplink data synthesizing (selection synthesizing) at the time of hand-over. The mobile station 11 performs downlink data synthesizing (maximum ratio synthesizing) and uplink data copying distribution. In this manner, the diversity hand-over function can maximize gain and stabilize the communications at the time of hand-over.

Radio communication branch control for the mobile station when it moves is explained below, with reference to FIG. 1. First, the mobile station 11 changes from a single branch status (left hand) with a radio base station 21 to a diversity hand-over status (center) by "adding" a branch with a radio base station 22 at a request from the mobile station 11. Next, the mobile station 11 moves to a single branch status (right hand) with the radio base station 22 by "deleting" or "cutting" the branch with the radio base station 21 at a request from the mobile station 11. The status changing is controlled by a radio control station 31.

When the mobile station 11 is under the radio environment where it can communicate with both the radio base station 21 and the radio base station 22 as shown at the center of FIG. 1, the mobile station 11 can start radio communications under diversity status and can maximize gain and stabilize the communications even when it does not move.

FIG. 2 shows an application system based on the WCDMA system, in which the present invention can be applied. The WCDMA system shown in FIG. 2 includes mobile stations (User Equipment: UE) 11, 12, 13 with a radio communication function, radio base stations (Node B) 21, 22, 23 with a radio communication function with the mobile stations, radio controlling stations (Radio Network Controller: RNC) 31, 32, 33 connected to the radio base stations, respectively, and controlling radio operations, and an exchange station 60 connected to the radio controlling stations and performing exchange operations. These stations provide mobile communication service between the mobile station 11 and the mobile station 12.

A network including the radio base stations 21, 22, 23 and the radio controlling stations 31, 32, 33 is called a "radio access network" (RAN). A network including the exchange station is called a "core network" (CN). In general the core network 80 has plural hierarchical exchange stations and further comprises a storage device such as a home memory for storing subscribers' information. Only one exchange station 60, however, is illustrated for simplicity of explanation, and the explanations of other devices are omitted.

In the system shown in FIG. 2, the mobile station 13 can transfer user data to the mobile station 11. The transferring route is one from the mobile station 13, via the radio base station 23, the radio controlling station 33, the exchange station 60, the radio controlling station 31 and the radio base station 21, to the mobile station 11. This communication route is referred to as an "external branch".

FIG. 2 also shows a short communication route via transmission devices, not via the exchange station 60. The radio access networks 71, 72 shown in FIG. 2, are provided with transmission devices 41, 42, respectively. The transmission devices 41, 42 are connected to the radio base stations 21, 22, respectively, and include a radio layer 2 protocol termination function as in the radio controlling station and further include a switching function that follows instructions from the radio controlling station or the exchange station. Two transmission devices can be formed as an integrated single device that can be connected to the radio base stations 21, 22. The transferring route of the user data is one from the mobile station 12, via the radio station 22, the transmission device 42, the transmission device 41 and the radio station 21, to the mobile station 11. This communication route is referred to as an "internal branch", a "private branch" or a "local branch".

By utilizing the local branch for communication within the area covered by the radio base stations 21 and 22, user data can be transferred on a short route without traveling through the radio controlling stations 31, 32. Mobile communication service providers can achieve transmission cost reduction by utilizing the local branch communication and therefore can offer special low priced services (referred to as "local branch service") to special subscribers. The local branch service can be applied to indoor area communication within a company user's buildings.

Such a system including the transmission devices 41, 42 is highly feasible especially when using transmission based on IP (Internet Protocol) reported in Non-patent Document #2. This is because IP is a connectionless protocol where data can be transferred based on only originating and destination addresses without considering a route, and therefore user data passing through the transmission devices can be easily controlled in the IP system.

As above explained, the system may include a radio base station that is not connected to the transmission, such as the radio base station 23 provided in an outside area. In this case, even if the mobile station 12 in local branch communication moves to the outside (toward the mobile station 13) and requires the radio controlling station 31 to add a communication branch with the radio base station 23, the branch with the radio base station 23 cannot be added while continuing the present local branch because the radio base station 23 cannot be connected to the transmission device 41. Accordingly, if there is a branch request while communicating on the local branch, the radio controlling station 31 determines whether the requested base station 23 can be connected to the currently used transmission device 41. If it is determined that the requested base station 23 cannot be connected to the presently used transmission device 41, the radio controlling station has to finish the current local branch communication.

When the mobile station 13 sends a request to start local branch communication under a radio environment where it can communicate with both the radio base station 22 communicable with the transmission device 41 and the radio base station 23 incommunicable with the transmission device 41, it is impossible to perform local branch communication under diversity communication status including radio base station 23 because the radio base station 23 cannot communicate with the transmission device 41. The radio controlling station 31 receives the request from the mobile station 13 and determines whether all the radio base stations communicable with the mobile station 13 can communicate with the transmission device 41. If at least one radio base station incommunicable with the transmission device 41 is found in the determination results, the radio controlling station 31 has to reject the local branch communication request. Accordingly, the radio controlling station 31 has to reject the local branch communication request completely, or allows communication starting in the external communication mode without using the transmission device 41.

[Non-patent Document #1]
3GPP Standard Specification S21.101
[Non-patent Document #2]
3GPP Technical Report TR25.933
[Patent Document #1]
JPL 2004-364054
[Patent Document #2]
JPL 2006-108891

DESCRIPTION OF THE INVENTION

Problem(s) to be Solved by the Invention

In the above prior art, when a branch addition request is made during local branch communication using the transmission device, it is determined whether the requested radio base station can communicate with the currently used transmission device. When it is determined that the requested radio base station cannot communicate with the currently used transmission device, the current local branch communication is terminated. Due to this control, the mobile station movement may disrupt the continuation of radio communication.

When there is one radio base station incommunicable with the transmission device at the time of starting local branch radio communication, starting the local branch communication is rejected. Due to this control, a service area where local branch communication service can be provided becomes narrowed.

A scheme that excludes all branches and base stations incommunicable with transmission devices in order to solve the above problems is not desirable, because it is difficult for this scheme to maximize gain or stabilize the resulting communication problems of continuing communication with degraded radio quality or wasting radio transmission capacity.

SUMMARY OF THE INVENTION

The present invention provides a method and system in a mobile radio communication service using transmission devices that can maximize communication gain and stabilize the communications.

Features of the present invention are set forth in the description that follows, and in part will become apparent from the description and the accompanying drawings, or may be learned by practice of the invention according to the teachings provided in the description. Problem solutions provided by the present invention will be realized and attained by a method and system particularly pointed out in the specification in such full, clear, concise, and exact terms as to enable a person having ordinary skill in the art to practice the invention.

To achieve these solutions and in accordance with the purpose of the invention, as embodied and broadly described herein, the invention provides a specific method and system as follows.

Means for Solving the Problem

An aspect of the present invention provides a mobile radio communications system comprising:
an exchange station;
first and second radio base stations configured to radio-communicate with a mobile station and configured to relay data from the mobile station;
first and second radio control stations configured to wire-communicate with the first and second radio base stations, respectively, and configured to establish a wired communication path for relaying the data transmitted from the mobile station to the exchange station;
a transmission device configured to wire-communicate with the first and second radio base stations, and configured to establish a local wired communication branch for relaying the data transmitted from the mobile station between the first and second radio base stations without going through the first or second radio control station;
a third radio base station configured to radio-communicate with the mobile station, and configured to relay the data transmitted from the mobile station, and incapable of communicating with the transmission device; and
a third radio control station configured to wire-communicate with the third radio base station, and configured to establish a wired communication branch for relaying the data transmitted from the mobile station to the exchange station, wherein
a method of adding a radio communication branch comprises the step of:
when a request for adding a radio communication branch through the third radio base station is generated while the data transmitted from the mobile station is being relayed via the local wired communication branch, determining whether to reject the request, based on a radio quality parameter between the mobile station and the third radio base station.

Another aspect of the present invention provides a mobile radio communications system comprising:
an exchange station;
first and second radio base stations configured to radio-communicate with a mobile station and configured to relay data from the mobile station;
first and second radio control stations configured to wire-communicate with the first and second radio base stations, respectively, and configured to establish a wired communication path for relaying the data transmitted from the mobile station to the exchange station;
a transmission device configured to wire-communicate with the first and second radio base stations, and configured to establish a local wired communication branch for relaying the data transmitted from the mobile station between the first and second radio base stations without going through the first or second radio control station;

a third radio base station configured to radio-communicate with the mobile station, and configured to relay the data transmitted from the mobile station, and incapable of communicating with the transmission device; and a third radio control station configured to wire-communicate with the third radio base station, and configured to establish a wired communication branch for relaying the data transmitted from the mobile station to the exchange station, wherein a method of adding a radio communication branch comprises the step of:

when a request for establishing radio communication branches through the first and third radio base stations is generated, determining which branch is to be established of the wired communication branch and the local wired communication branch, based on a radio quality parameter between the mobile station and the third radio base station.

Another aspect of the present invention provides a mobile radio communications system comprising:

an exchange station;

first and second radio base stations configured to radio-communicate with a mobile station and configured to relay data from the mobile station;

first and second radio control stations configured to wire-communicate with the first and second radio base stations, respectively, and configured to establish a wired communication path for relaying the data transmitted from the mobile station to the exchange station;

a transmission device configured to wire-communicate with the first and second radio base stations, and configured to establish a local wired communication branch for relaying the data transmitted from the mobile station between the first and second radio base stations without going through the first or second radio control station;

a third radio base station configured to radio-communicate with the mobile station, and configured to relay the data transmitted from the mobile station, and incapable of communicating with the transmission device; and a third radio control station configured to wire-communicate with the third radio base station, and configured to establish a wired communication branch for relaying the data transmitted from the mobile station to the exchange station, the first radio control station, comprising:

a parameter receiving unit configured to receive a radio quality parameter between the mobile station and the third radio base station;

a parameter storing unit configured to store a radio quality determination threshold;

a comparing unit configured to compare the received radio quality parameter with the radio quality determination threshold; and a deciding unit configured to decide whether to continue the local wired communication branch, based on the comparison result.

The first radio control station may further comprise a counting unit configured to count the number of comparisons, wherein the deciding unit decides whether to continue the local wired communication branch based on the counted number.

In the first radio control station, the radio quality determination threshold and a counter number determination threshold can be varied from the outside.

Another aspect of the present invention provides a mobile radio communications system comprising:

an exchange station;

first and second radio base stations configured to radio-communicate with a mobile station and configured to relay data from the mobile station;

first and second radio control stations configured to wire-communicate with the first and second radio base stations, respectively, and configured to establish a wired communication path for relaying the data transmitted from the mobile station to the exchange station;

a transmission device configured to wire-communicate with the first and second radio base stations, and configured to establish a local wired communication branch for relaying the data transmitted from the mobile station between the first and second radio base stations without going through the first or second radio control station;

a third radio base station configured to radio-communicate with the mobile station, and configured to relay the data transmitted from the mobile station, and incapable of communicating with the transmission device; and a third radio control station configured to wire-communicate with the third radio base station, and configured to establish a wired communication branch for relaying the data transmitted from the mobile station to the exchange station, wherein the first radio control station, comprises:

a parameter receiving unit configured to receive a radio quality parameter between the mobile station and the third radio base station;

a parameter storing unit configured to store a radio quality determination threshold;

a comparing unit configured to compare the received radio quality parameter with the radio quality determination threshold; and a deciding unit configured to decide whether to continue the local wired communication branch, based on the comparison result.

ADVANTAGE OF THE INVENTION

According to embodiments of the present invention, it is possible during local branch communication to prevent radio wave interference by radio base stations incapable of local branch communication, enlarge local branch service areas, and improve continuity of the local branch communication.

According to embodiments of the present invention, it is possible at the time of receiving a local branch communication request to prevent radio wave interference by radio base stations incapable of local branch communication, enlarge local branch service areas, and improve continuity of the local branch communication.

According to embodiments of the present invention, mobile radio providers only have to add some functions to radio controlling stations in the existing network in order to make it possible to prevent radio wave interference by radio base stations incapable of local branch communication, enlarge local branch service areas, and improve continuity of the local branch communication.

According to embodiments of the present invention, each parameter can be selected and varied to provide flexible local branch communication services.

DESCRIPTION OF THE PREFERRED EMBODIMENTS

In the following, embodiments of a system and method for establishing or adding a radio communication channel according to the present invention are described with reference to the accompanying drawings, wherein common reference numbers are assigned to items that have the same functions, and the descriptions are not repeated.

Figure 1:
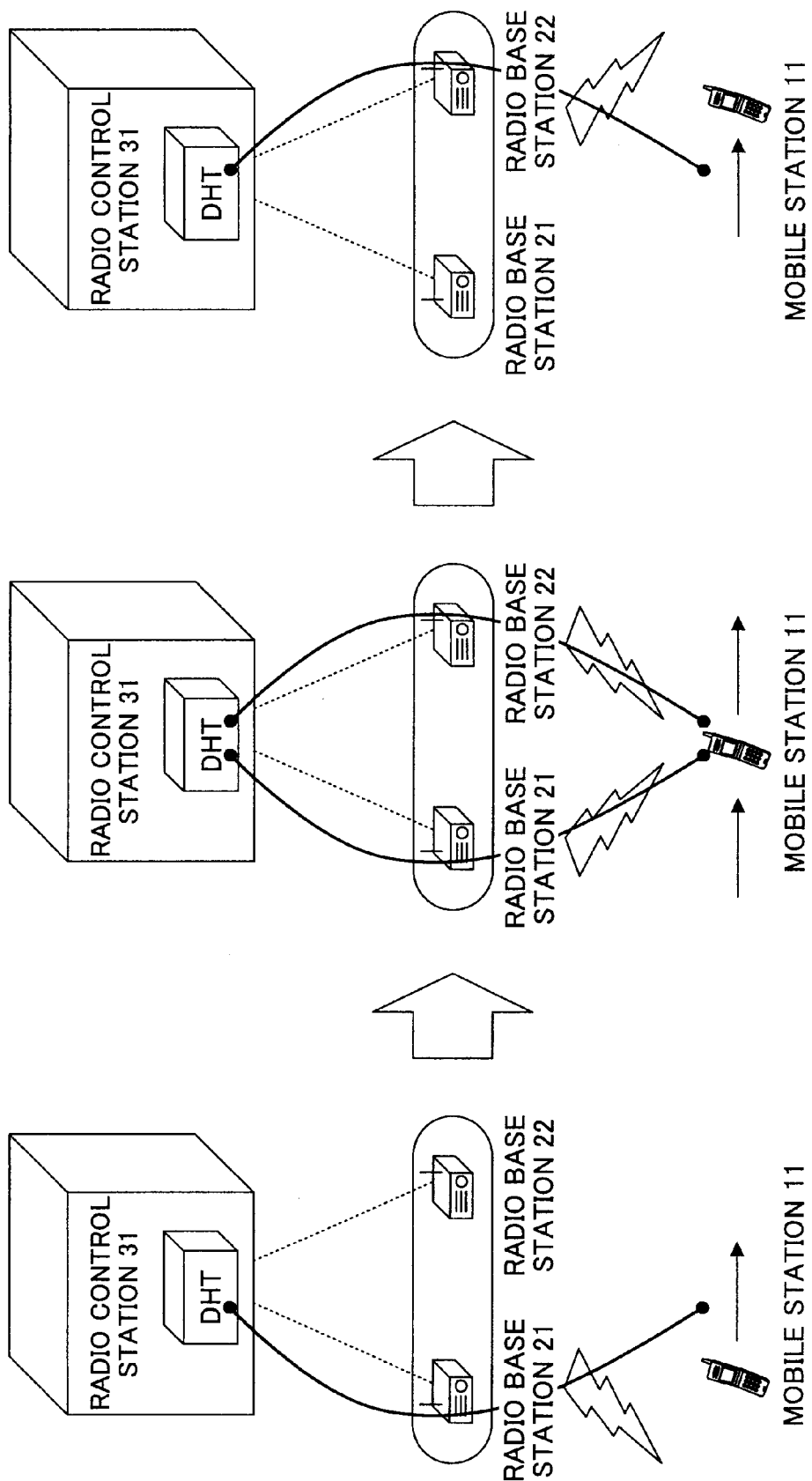
FIG. 1 is a schematic diagram illustrating communication branches at the time of diversity hand-over.
Figure 2:
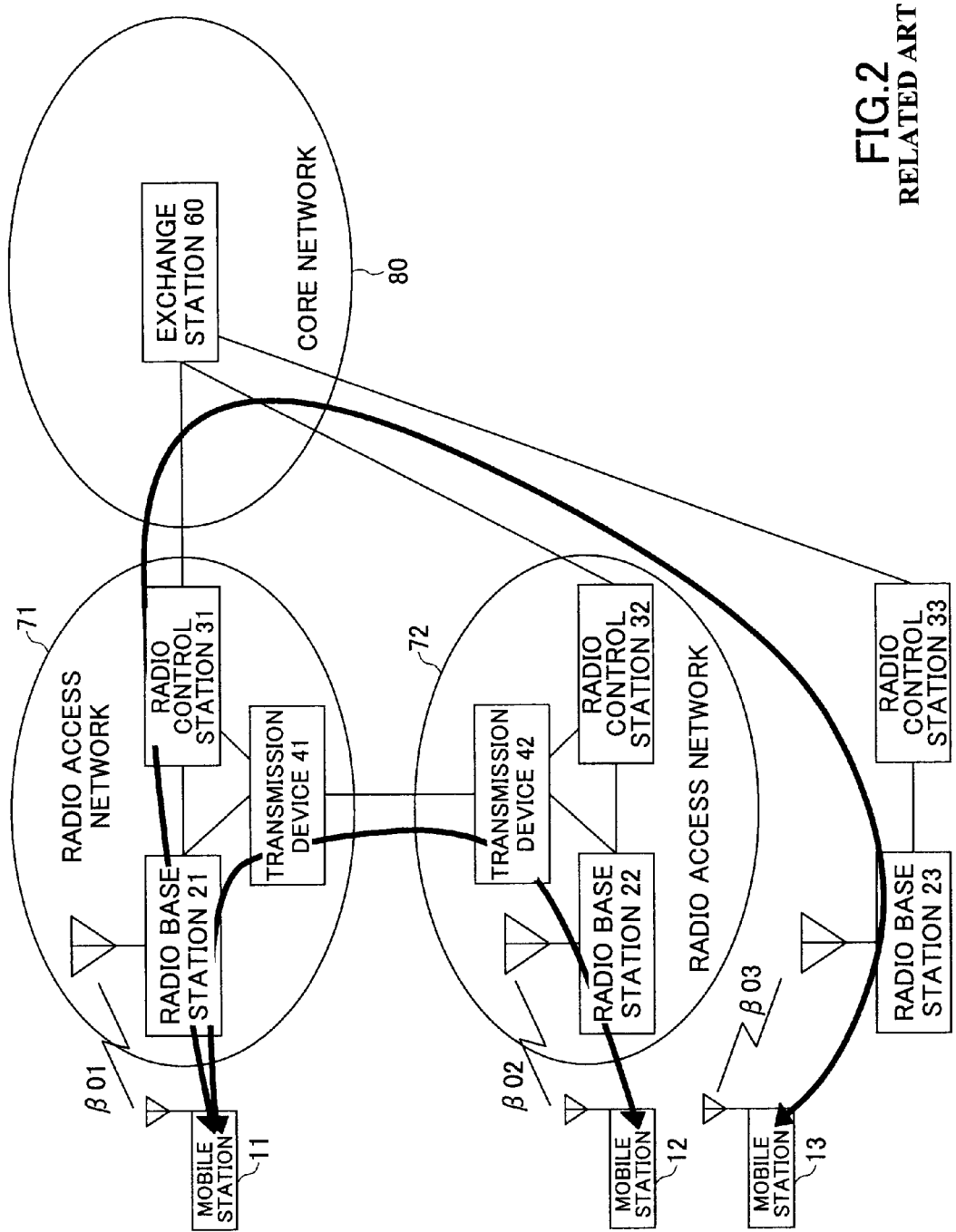
FIG. 2 is a schematic diagram illustrating local branch communication in the WCDMA system.
Figure 3:
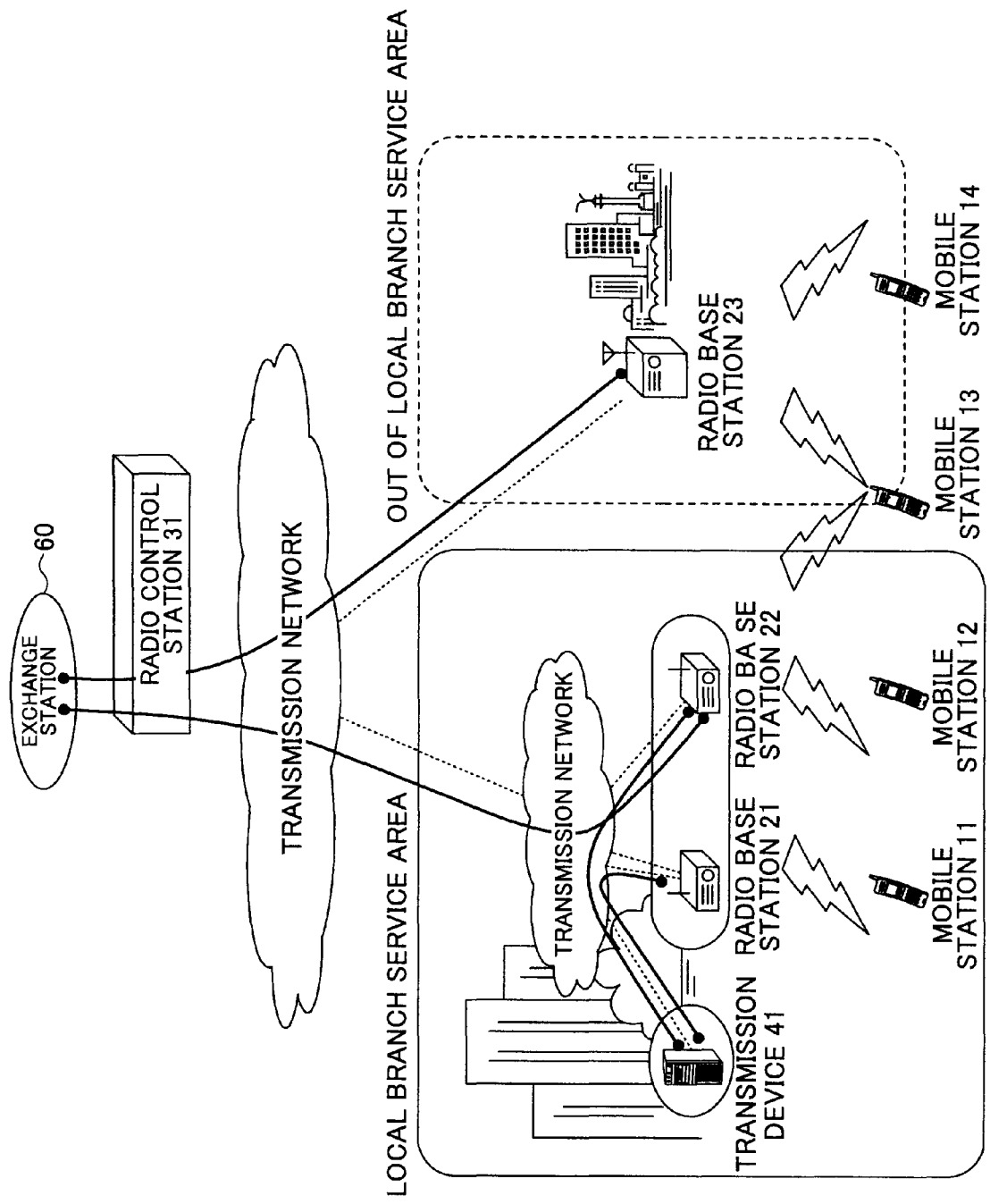
FIG. 3 is a schematic diagram illustrating local branch communication according to one embodiment of the present invention.

A mobile radio communications system 10 according to one embodiment of the present invention is shown in FIGS. 2 and 3 and includes mobile stations 11, 12 and 13, radio access networks 71 and 72, a radio base station 23, a radio control station 33 and a core network 80. The radio access networks 71 and 72 include radio base stations 21, 22, radio control stations 31, 32 and transmission devices 41, 42, respectively. Although the radio access networks 71, 72 generally include many radio base stations and many radio control stations, they are shown as having a single radio base station and a single radio control station for simplicity of explanation. Although the core network 80 generally includes plural core networks having hierarchical exchange stations and home memories for storing subscribers' information, only one exchange station 60 is shown for simplicity of explanation and other exchange stations are omitted.

The transmission devices 41 and 42 may be one device, but FIG. 2 shows two independent transmission devices included in respective radio access networks 71 and 72. The transmission device function and the radio base station function can be built in a single device, but FIG. 2 shows them separately.

The mobile radio communications system 10 shown in FIG. 2 can provide a local (or private) branch radio communication service as shown in FIG. 3, in which the radio base stations 21 and 22 are internally connected to each other only via the transmission device 41 not via the external exchange station 60.

Figure 4:
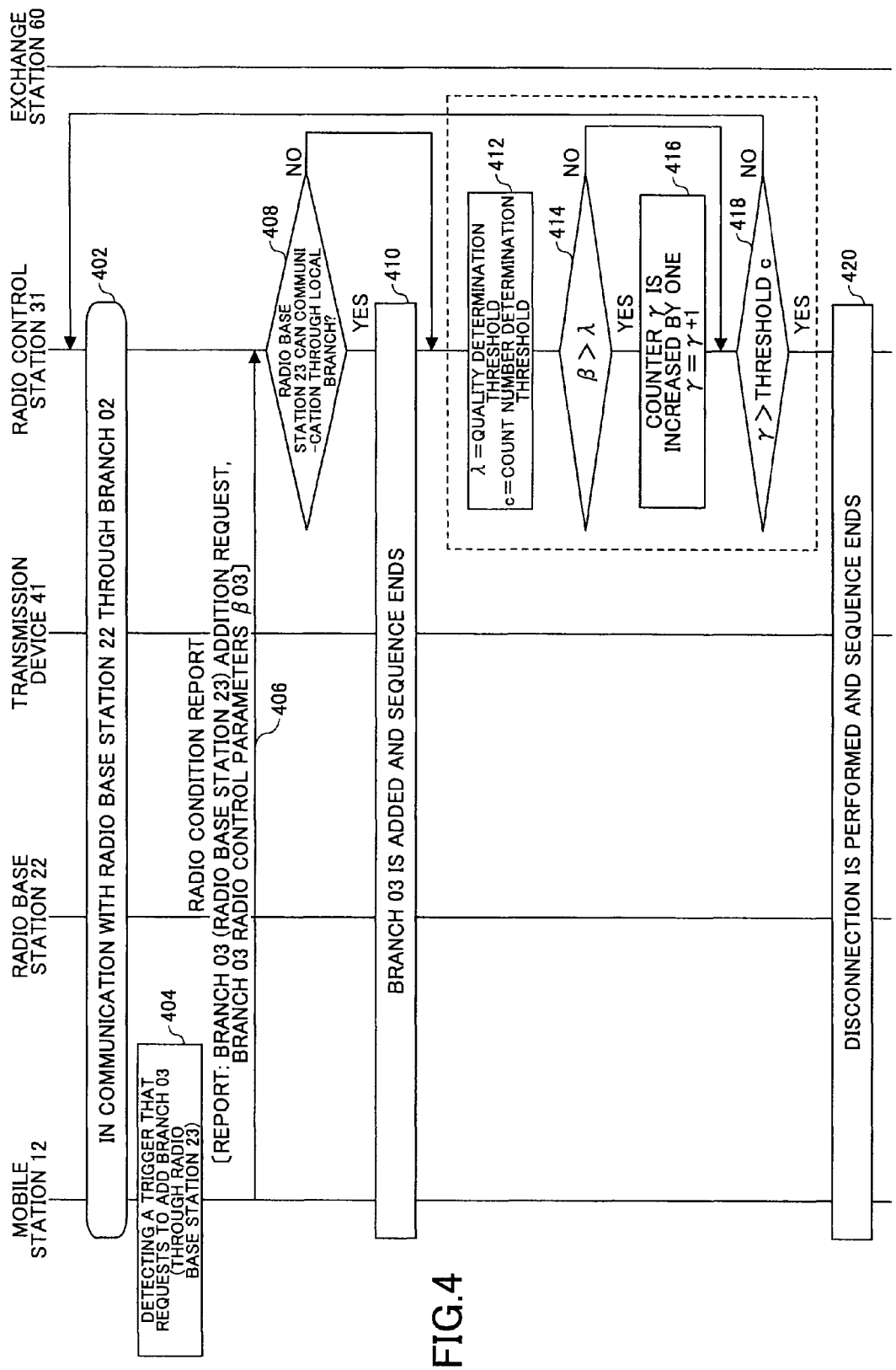
FIG. 4 is a sequence chart explaining a branch addition procedure according to one embodiment of the present invention.

With reference to FIGS. 2 and 4, a sequence of procedures for adding a communication branch in accordance with one embodiment of the present invention will be explained below.

In the mobile radio communications system 10 shown in FIG. 2, the mobile station 12 is in communication with the mobile station 11 through a branch 02 via the radio base station 22 and the transmission device 41 (Step 402 in FIG. 4). It is determined by a certain algorithm (Step 404) that the quality of radio communication with the radio base station 23 through another branch 03 has become better due to the movement of the mobile station 12, for example. The certain algorithm (Step 404) can be a known algorithm and therefore its explanation is omitted. Upon such determination, the mobile station 12 sends a radio condition report message to the radio control station 31, requesting to add the branch 03 (Step 406). The radio condition report message 406 includes a radio quality parameter β03, which may be, but not limited to, electric field strength, a radio wave loss, a signal-to-interference ratio (SIR), etc.

If there is no response from the radio control station 31 after the radio condition report message 406 requesting to add the branch 03 has been sent, the mobile station 12 resends the radio condition report message 406 repeatedly in accordance with a predetermined algorithm.

The radio control station 31 receives the radio condition report message 406 and then determines by a determination algorithm whether the radio base station 23 can communicate with the transmission device 41 (Step 408). The determination algorithm may be a known algorithm and its explanation is omitted. When it is determined that the radio base station 23 can communicate with the transmission device 41, the branch 03 is added based on the branch addition request and the sequence ends (Step 410).

On the other hand, when it is determined that the radio base station 23 cannot communicate with the transmission device 41, it is determined by a predetermined determination algorithm whether the radio quality parameter β is larger than a quality determination threshold λ (Steps 412, 1414). The determination algorithm may be a known algorithm and its explanation is omitted. When it is determined that the radio quality parameter β03 is larger than the threshold λ (the radio quality parameter for the requested branch 03 is good enough) (Yes at Step 414), it is not desirable to continue the local branch communication.

In this case, a counter γ is increased by one (Step 416). When it is determined that the counter γ exceeds a predetermined quality determination counter number c (Step 418), it is determined that the radio wave influence by the incommunicable branch 03 is significantly large and continued local branch communication may adversely affect radio capacity and radio quality so that the local branch communication is disconnected (Step 420).

On the other hand, when it is determined that the radio quality parameter β03 is not larger than the threshold λ (the radio quality parameter for the requested branch 03 is not good enough) (No at Step 414), it is determined that the radio wave influence by the incommunicable branch 03 is small enough and continued local branch communication does not affect radio capacity and radio quality so much and the local branch communication is adequate. In this case, it is determined whether the counter number γ exceeds the threshold c. After making sure that the counter number γ does not exceed the threshold c (No at Step 418) (the counter number γ cannot exceed the threshold c because of no increment, but this determination is performed as a guard process), the process procedure goes back to the starting point 402, where the branch addition request is disregarded and the local branch communication is continued. At Step 416, the counter number γ can be increased by any number other than one in accordance with the result of the quality determination.

One of the unique features in the sequence shown in FIG. 4 according to this embodiment of the present invention is the procedures surrounded by a dotted line square. That is, the present local branch communication is not immediately finished even if the received request requests to add a branch incapable of local branch communication (No at Step 408). First, the radio quality determination threshold λ and the quality determination counter number c are defined (Step 412), and then the local branch communication is finished only if the radio quality parameter β continuously exceeds the threshold λ, and the request for adding the branch is disregarded to continue the local branch communication if not.

The maximum value settable for the threshold λ can be specially defined as deemed to be an infinitely large value, and accordingly the local branch communication would always be adequately continued irrespective of the counter γ.

In a system such as the WCDMA system where an individual control channel is first set at its starting point of a communication sequence, and then a traffic channel is added, two different thresholds λ can be defined for the individual control channel status and the added traffic channel status.

Figure 5:
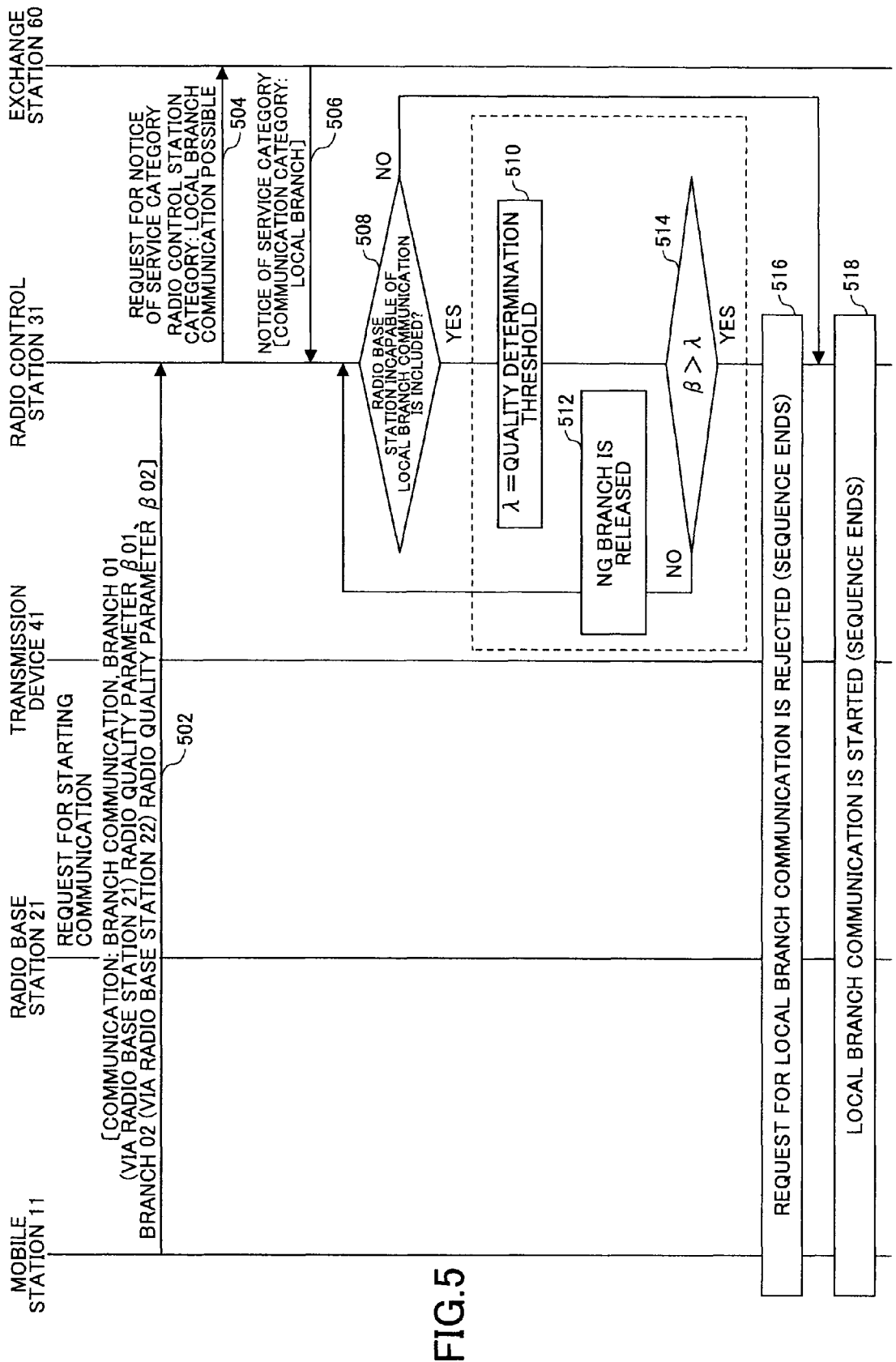
FIG. 5 is a sequence chart explaining a branch starting procedure according to another embodiment of the present invention.

With reference to FIGS. 5 and 2, a sequence of procedures for adding a communication branch in accordance with another embodiment of the present invention will be explained below.

In the mobile radio communications system 10 shown in FIG. 2, the mobile station 11 is trying to start local branch communication under control of the radio base stations 21 and 22. At this time, the mobile station 11 sends a request for starting local branch communication to the radio control station 31 (Step 502). The request 502 for starting local branch communication includes a radio quality parameter β for each of the radio base stations 21, 22. The radio quality parameter β may be, but not limited to, electric field strength, a radio wave loss, a signal-to-interference ratio (SIR), etc.

The radio quality parameters β for the branch 01 of the radio base station 21, the branch 02 of the radio base station 22 and the branch 03 of the radio base station 23 are referred to as β01, β02 and β03, respectively. Based on the request 502 for starting local branch communication sent from the mobile station 11, the radio control station 31 asks (by an asking algorithm) the exchange station 60 about subscriber's information to determine (by a determination algorithm) whether to allow connecting the local branch communication (Steps 504, 506). The asking algorithm and the determination algorithm may be known algorithms and their explanations are omitted.

In this sequence of communication starting procedures, if it is determined that all radio base stations contained in the request 502 for starting local branch information sent from the mobile station 11 are connected to the transmission device 41, as the radio base stations 21 and 22 are, and that the local branch communication is possible (No at Step 508), the radio control station 31 starts the local branch communication and ends the sequence (Step 518).

On the other hand, if the mobile station 11 is under a condition where it can communicate with all the radio base stations 21, 22 and 23, and it is determined (Yes at Step 508) that the request 502 for starting local branch information sent from the mobile station 11 contains information of a radio base station that is not connected to the transmission device 41 and is incapable of local branch communication, then it is determined whether its radio quality parameter β of the radio base station incapable of local branch communication is larger than a threshold λ (Step 514). If it is determined that the radio quality parameter β is not larger than the threshold λ (the radio quality is not good enough) (No at Step 514), it is determined that the local branch communication connection is adequate, the low quality branch is disregarded or released (Step 512) and the procedure goes back to the determination step 508, where it is determined again whether there exists a branch that is incapable of local branch communication.

If all the radio base stations contained in the request, which are incapable of local branch communication, are disregarded or released (that is, there is no radio base station incapable of local branch communication any longer) (No at Step 508) through the quality determination process, then the local branch communication is started (Step 518).

On the other hand, if it is determined that the radio quality parameter β of the radio base station incapable of local branch communication is larger than the threshold λ (the radio quality is good enough) (Yes at Step 514), it is determined that the local branch communication is inadequate. Then the local branch communication is rejected and the sequence ends (Step 516).

One of the unique features in the sequence shown in FIG. 5 according to this embodiment of the present invention is the procedure surrounded by a dotted line square. That is, the requested local branch communication is not immediately rejected even if the received request for starting local branch communication includes a branch incapable of communicating with the transmission device 41 (Yes at Step 508). First, it is determined whether the radio quality parameter β of the incapable branch is larger than the determination threshold λ. Only if the radio quality parameter β of the incapable branch is larger than the determination threshold λ, then the local branch communication request is rejected. If not, the low quality branches contained in the request are all disregarded or deleted, and the local branch communication is started only with branches capable of local branch communication.

The maximum value settable for the threshold λ can be specially defined as deemed to be an infinitely large value, and accordingly the local branch communication can always adequately be started irrespective of the radio quality parameter β.

In actual communication services, communication services providers can freely define and flexibly vary the quality threshold value λ and the quality determination counter number threshold c, in accordance with the network structure and service status. By tuning these parameters, it is possible to properly manage the network service with consideration of balancing the local communication area sizes and the radio transmission qualities.

Figure 6:
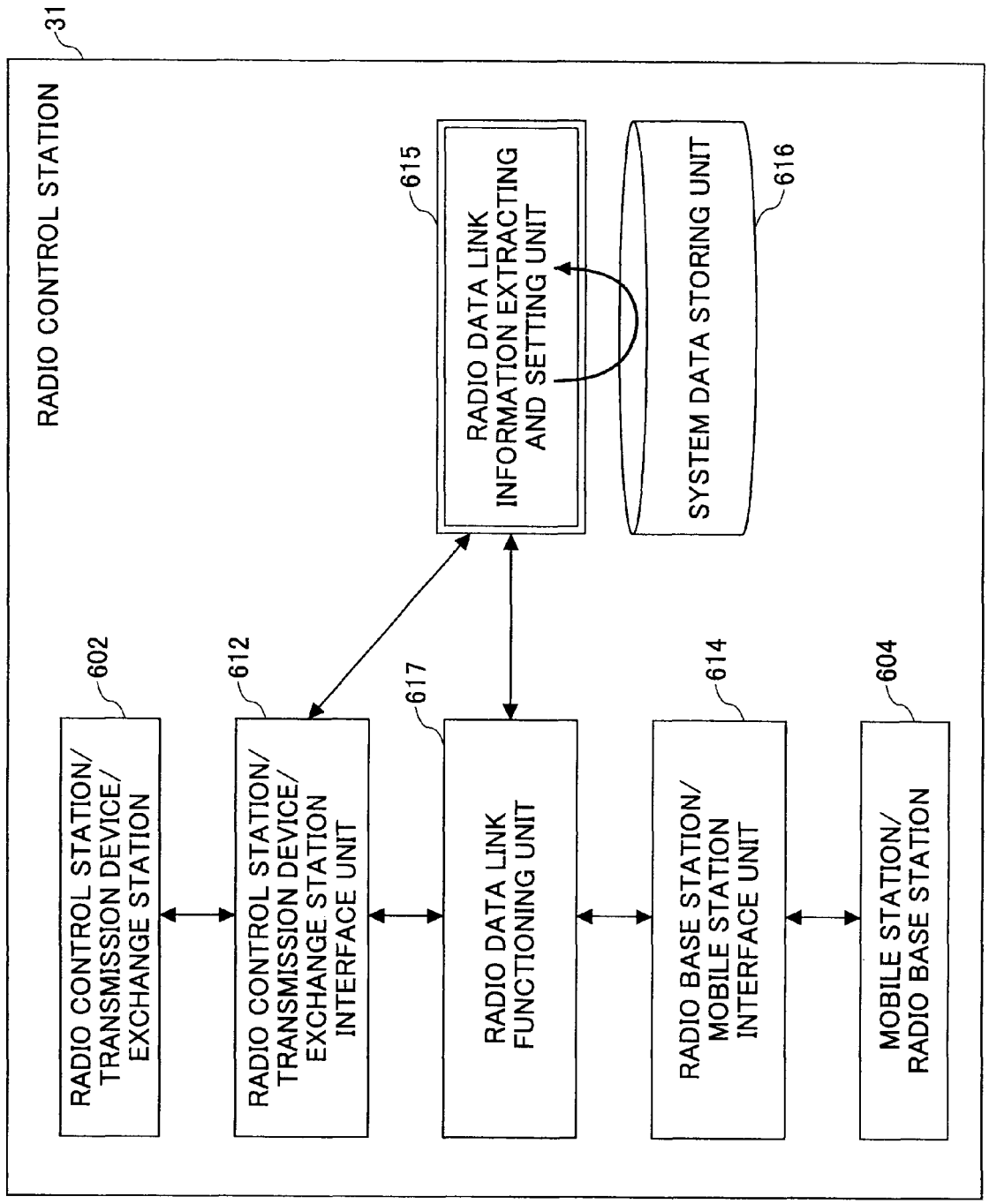
FIG. 6 is a schematic diagram illustrating a radio control station according to one embodiment of the present invention.

FIG. 6 shows an example of a radio control station in accordance with an embodiment of the present invention. A radio control station 31 includes a radio base station/mobile station interface unit 614, a radio control station/transmission device/exchange station interface unit 612, a radio data link functioning unit 617, and a system data storing unit 616. The radio base station/mobile station interface unit 614 transmits and receives signals to and from the radio base station/mobile station. The radio control station/transmission device/exchange station interface unit 612 transmits and receives signals to and from the radio control station/transmission device/exchange station. The radio data link functioning unit 617 performs radio data link establishment and deletion. The system data storing unit 616 stores system data for operating the radio control station 31. The radio control station 31 may include other varieties of function units.

In the embodiment of the present invention, the system data storing unit 616 can store the quality determination threshold λ and the quality determination count number threshold c. Communication service providers can flexibly vary these thresholds, in accordance with the network establishment, maintenance and operation.

The radio control station 31 may further include a radio data link information extracting and setting unit 615, which performs comparison (Step 414, Step 514) between the radio quality parameter β sent from the mobile station and quality determination threshold λ, counts the number of determinations (Step 416), and performs comparison (Step 418) between the counter number of γ and the threshold c.

The radio control station 31 receives a request for starting local branch communication and a radio condition report message from the mobile station 11, and sends a radio quality parameter from the radio data link functioning unit 617 to the radio data link information extracting and setting unit 615.

The radio data link information extracting and setting unit 615 extracts a radio quality parameter determination threshold λ from the system data storing unit 616, performs a comparison with the radio quality parameter β sent from the mobile station 11, and transmits a comparison result to the radio data link functioning unit 617. During the branch addition process, the radio data link information extracting and setting unit 615 extracts a radio quality parameter determination counter number threshold c, and transmits a determination result based on the counter number to the radio data link functioning unit 617.

Figure 7:
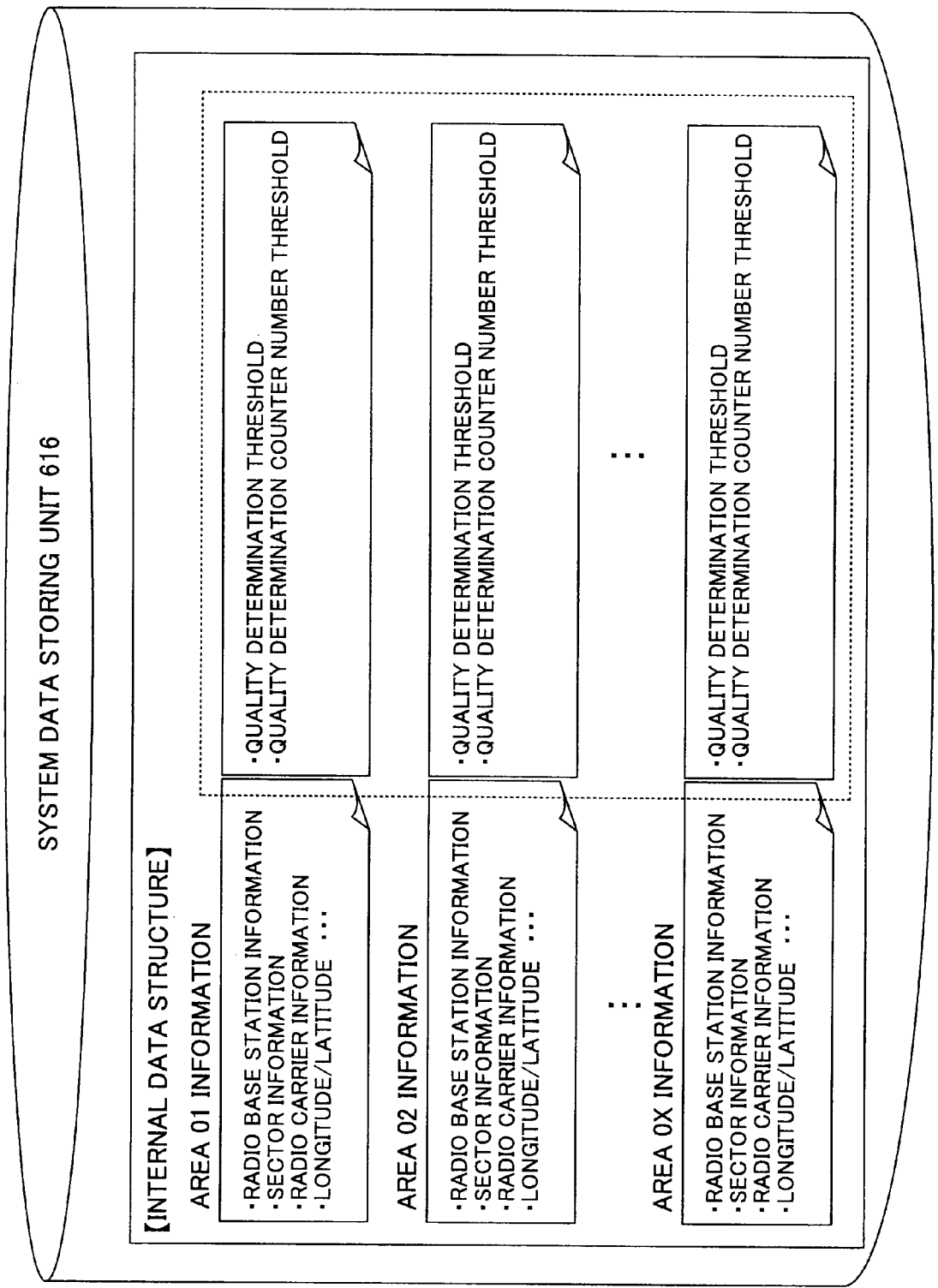
FIG. 7 is a schematic diagram illustrating an internal data structure of a system data storing unit according to one embodiment of the present invention.

FIG. 7 shows an internal data structure of the system data storing unit 616 in accordance with this embodiment of the present invention. The system data storing unit 616 of the radio control station 31 stores a quality determination threshold 1 and a quality determination counter number threshold c per each radio communication area (cell).

The system and method for establishing and adding a radio communication channel in accordance with the embodiments of the present invention are applicable to mobile communications systems, and can securely continue radio communication even when mobile stations are moving and can enlarge a communication area while the radio communication gain is maximized and communication is kept stable.

The present invention is not limited to these embodiments, but variations and modifications may be made without departing from the scope of the present invention.

The present application is based on Japanese Priority Application No. 2006-221263 filed on Aug. 14, 2006 with the Japanese Patent Office, the entire contents of which are hereby incorporated by reference.

What is claimed is:

1. A mobile radio communications system comprising:
   an exchange station;
   first and second radio base stations configured to radio-communicate with a mobile station and configured to relay data from the mobile station;
   first and second radio control stations configured to wire-communicate with the first and second radio base stations, respectively, and configured to establish a wired communication path for relaying the data transmitted from the mobile station to the exchange station;
   a transmission device configured to wire-communicate with the first and second radio base stations, and configured to establish a local wired communication branch for relaying the data transmitted from the mobile station between the first and second radio base stations without going through the first or second radio control station;
   a third radio base station configured to radio-communicate with the mobile station and configured to relay the data transmitted from the mobile station; and
   a third radio control station configured to wire-communicate with the third radio base station, and configured to establish a wired communication branch for relaying the data transmitted from the mobile station to the exchange station; wherein
   a method of adding a radio communication branch comprises:
   when a request for adding a radio communication branch through the third radio base station is generated while the data transmitted from the mobile station is being relayed via the local wired communication branch,
   adding a radio communication branch when it is determined that the third radio base station can communicate with the transmission device, and
   determining whether to reject the request, based on a radio quality parameter between the mobile station and the third radio base station when it is determined that the third radio base station can not communicate with the transmission device.

2. A mobile radio communications system comprising:
   an exchange station;
   first and second radio base stations configured to radio-communicate with a mobile station and configured to relay data from the mobile station;
   first and second radio control stations configured to wire-communicate with the first and second radio base stations, respectively, and configured to establish a wired communication path for relaying the data transmitted from the mobile station to the exchange station;
   a transmission device configured to wire-communicate with the first and second radio base stations, and configured to establish a local wired communication branch for relaying the data transmitted from the mobile station between the first and second radio base stations without going through the first or second radio control station;
   a third radio base station configured to radio-communicate with the mobile station and configured to relay the data transmitted from the mobile station; and
   a third radio control station configured to wire-communicate with the third radio base station, and configured to establish a wired communication branch for relaying the data transmitted from the mobile station to the exchange station; wherein
   a method of adding a radio communication branch comprises:
   when a request for establishing radio communication branches through the first and third radio base stations is generated, determining which branch to be established of the wired communication branch and the local wired communication branch, based on a determination whether the third radio base station can communicate with the transmission device and a radio quality parameter between the mobile station and the third radio base station.

* * * * *